(No Model.)

T. COSBEY.
MEDICINE SPOON.

No. 265,390. Patented Oct. 3, 1882.

Attest:
Charles Pickles
Albert G. Fish

Inventor:
Thomas Cosbey
By Knight Bro
Attys.

UNITED STATES PATENT OFFICE.

THOMAS COSBEY, OF ST. LOUIS, MISSOURI.

MEDICINE-SPOON.

SPECIFICATION forming part of Letters Patent No. 265,390, dated October 3, 1882.

Application filed July 3, 1882. (No model.)

*To all whom it may concern:*

Be it known that I, THOMAS COSBEY, of the city of St. Louis, State of Missouri, have invented a certain new and useful Improvement in Medicine-Spoons, of which the following is a full, clear, and exact description, reference being had to the accompanying drawings, forming part of this specification, and in which—

Figure 1:
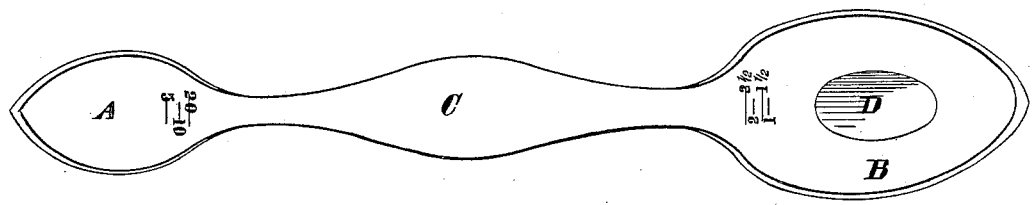
Figure 2:
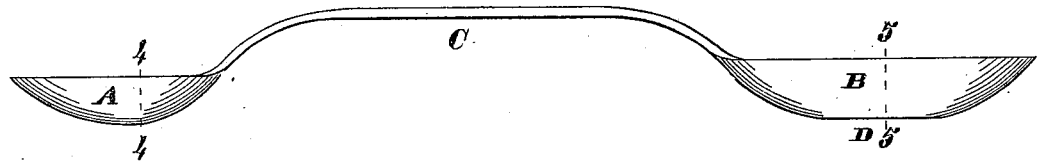
Figure 3:
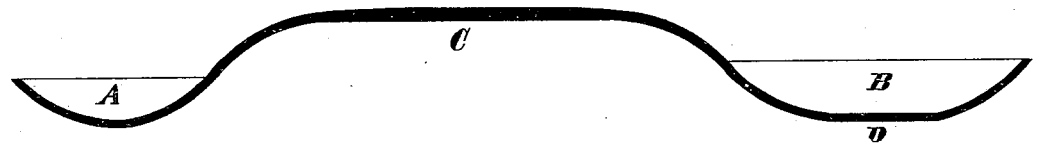
Figure 4:
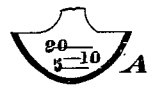
Figure 5:
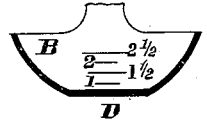

Figure 1 is a top view. Fig. 2 is a side view. Fig. 3 is a longitudinal section. Fig. 4 is a transverse section on line 4 4, Fig. 2; and Fig. 5 is a similar view on line 5 5, Fig. 2.

My invention relates to a table and tea spoon made in one piece; and my invention consists in spoons thus formed and in graduating their bowls, the bowl of the tea-spoon being graduated so that any given number of drops can be measured and ascertained without counting them, and the bowl of the table-spoon being graduated to measure a tea-spoonful, a tea-spoonful and a half, &c.

A represents the bowl of the tea-spoon, B the bowl of the table-spoon, and C the connecting-handle. The bowl of the table-spoon has a flat bottom, D, so that the spoons will remain upright and not fall over sidewise when placed on a table or surface.

A medicine-spoon thus made is very convenient, as either the tea-spoon or table-spoon may be used, and, as is often desired, when placed upon a table it will not fall over, spilling the contents.

The bowl of the tea-spoon is made somewhat deeper and with nearer vertical sides than is usual, and is graduated, as shown, so that any number of drops can be measured, avoiding the necessity of counting them.

The bowl of the table-spoon is graduated, as shown, so that anything over a tea-spoonful— as, for instance, a tea-spoonful and a half or two tea-spoonsful—can be measured.

I claim as my invention—

1. As a new article of manufacture, a medicine-spoon consisting of handle C and bowls A and B, the latter having a flat portion, D, substantially as set forth.

2. In a medicine-spoon, the combination of bowl A, connecting-handle C, and bowl B, the bowls being graduated substantially as shown, and that of B having a flat bottom, D, as set forth.

THOMAS COSBEY.

Witnesses:
SAML. KNIGHT,
GEO. H. KNIGHT.